United States Patent [19]

Kato

[11] Patent Number: 5,311,355
[45] Date of Patent: May 10, 1994

[54] AFOCAL ZOOMING OPTICAL SYSTEM

[75] Inventor: Hiroyuki Kato, Nagano, Japan

[73] Assignee: Asahi Kogaku Kogyo Kabushiki Kaisha, Tokyo, Japan

[21] Appl. No.: 800,121

[22] Filed: Nov. 29, 1991
(Under 37 CFR 1.47)

[30] Foreign Application Priority Data

Nov. 30, 1990 [JP] Japan .................. 2-335937

[51] Int. Cl.⁵ .............. G03B 13/10; G02B 25/00
[52] U.S. Cl. ...................... 359/432; 359/422; 359/691; 359/646
[58] Field of Search ........... 359/432, 422, 691, 646

[56] References Cited

U.S. PATENT DOCUMENTS 4,909,614 3/1990 Itoh et al. ..................... 359/683
5,194,886 3/1993 Mukai et al. .................. 359/643

FOREIGN PATENT DOCUMENTS 22766 of 1915 United Kingdom ............. 359/422
125095 4/1919 United Kingdom ............. 359/422
466823 6/1937 United Kingdom ............. 359/422

Primary Examiner—Jon W. Henry
Attorney, Agent, or Firm—Sughrue, Mion, Zinn, Macpeak & Seas

[57] ABSTRACT

An afocal zooming optical system includes, in order from the object side, an objective optical unit comprising a positive first lens group, an erecting prism component and a negative second lens group, and an eyepiece optical unit comprising a three-element positive third lens group and a single-element positive fourth lens group, which system performs zooming by moving the second and third lens groups in different directions along the optical axis and satisfies certain conditions.

4 Claims, 9 Drawing Sheets

AFOCAL ZOOMING OPTICAL SYSTEM

BACKGROUND OF THE INVENTION

This application is based on and claims priority from Japanese Application No. HEI 2-335937 filed Nov. 30, 1990, the disclosure of which is incorporated by reference herein.

The present invention relates to an afocal optical system for use with binoculars and monoculars, particularly to a zooming optical system capable of changing the magnification.

Conventional zooming optical systems have their zooming ability distributed between the eyepiece optical unit and the objective optical unit, and the distribution ratio is usually higher for the eyepiece unit. This is because zooming by the eyepiece unit provides ease in correcting aberrations.

However, if the eyepiece optical unit has a higher zooming ability than the objective unit, the apparent "field of view" will vary. The user of a binocular or similar optical instrument senses subjectively the magnification of an image as the relationship between the frame defining the field and the size of the object. Hence, he feels a change of image magnification if the object magnification changes but the apparent field remains the same. However, a change in image magnification is difficult to perceive if both the object magnification and the field size vary as in the conventional zooming optical system.

Another problem with a conventional afocal zooming optical system is that its overall length is apt to increase because it is necessary to ensure not only a long distance (eye relief) between the face of the eye lens that is the closest to the eye of the viewer and an optimal position for looking through the viewfinder, but also a sufficient space for zooming. In order to realize a compact system, the powers of the individual lens groups must be increased, but then it becomes difficult to correct aberrations.

SUMMARY OF THE INVENTION

It is an object of the present invention to provide an afocal zooming optical system that is capable of suppressing variations in the apparent field of view during zooming, that is compact and that is effectively corrected for aberrations.

This and other objects of the invention are attained by an afocal zooming optical system comprising, in order from the object side, an objective optical unit comprising a positive first lens group, an erecting prism component and a negative second lens group, and an eyepiece optical unit comprising a three-element positive third lens group and a single-element positive fourth lens group, which system performs zooming by moving said second and third lens groups in different directions along the optical axis and satisfies the following conditions:

$$few/fet \leq 1.30 \quad (1)$$

$$1.70 < fG4/fG3 < 4.50 \quad (2)$$

where few is the focal length of the eyepiece optical unit at low magnification; fet is the focal length of the eyepiece optical unit at high magnification; fG3 is the focal length of the third lens group; and fG4 is the focal length of the fourth lens group.

BRIEF DESCRIPTION OF THE DRAWINGS

The invention will be more clearly understood from the following description in conjunction with the accompanying drawings, in which.

Figure 1:
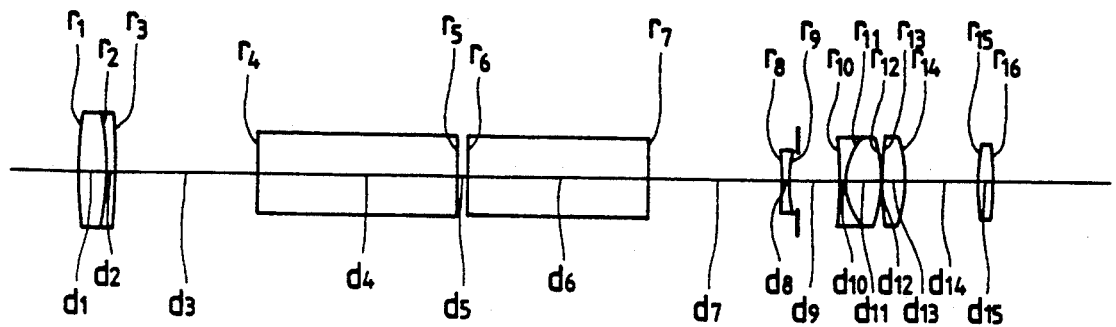
FIG. 1 is a simplified diagrammatic cross section of a lens system for an afocal zooming optical system of the present invention, for a low magnification.

In the drawings, ER is the eye ring, ER$\phi$ means a diameter of the eye ring, B is the angle defined by the optical axis and the principal ray of the exit pupil light flux.

DETAILED DESCRIPTION OF THE INVENTION

The present invention will be described below with reference to its preferred embodiments. The terms "group" and "component" are used interchangeably in this specification and claims, each designating a unit of at least one lens element.

Each of the optical systems according to the examples to be described below has a four-group composition satisfying conditions (1) and (2) as set forth above herein in the Summary of the Invention.

Condition (1) specifies the ratio of zooming achieved by the eyepiece optical unit. By reducing this zoom ratio to a low level, variations in the apparent field of view can be suppressed and only the size of image within a constant field will vary during zooming, thereby making it easy for the viewer to perceive the zooming process. If the ratio of zooming by the eyepiece optical unit exceeds 1.30, the apparent field will change so greatly during zooming that it becomes difficult for the viewer to check the zooming process.

Condition (2) specifies the power distribution between the third and the fourth lens groups, or components. If the power of the third lens group becomes greater than that of the fourth lens group to such an extent that the upper limit of this condition is exceeded, it becomes difficult to correct aberrations, in particular, coma and distortion. If the lower limit of condition (2) is not reached, the amount of lens movement increases to make it difficult to realize a compact system.

In order to suppress the power of the fourth lens group and yet reduce variations in the apparent field, the following condition (3) is desirably satisfied:

$$few/fG4 < 0.55 \quad (3)$$

If this condition is not met, the power of the fourth lens group becomes relatively large, making it difficult to satisfy the condition (1).

For reducing the cost of the overall lens system, the following condition (4) is preferably satisfied:

$$nav < 1.63 \quad (4)$$

where nav is the mean refractive index at the d-line of the lens elements included in the respective lens groups.

In the examples to be described below, the second lens group is composed of a single negative lens element and the third lens group is composed of a positive-to-negative cemented lens and a positive lens element, and the following conditions (5) and (6) are satisfied:

$$|r2i/r2o| < 0.85 \quad (5)$$

$$|r3c/r3i| < 0.50 \quad (6)$$

where r2i is the radius of curvature (r8) of the entrance face of the second lens group; r2o is the radius of curvature (r9) of the exit face of the second lens group; r3i is the radius of curvature (r10) of the face of the third lens group that is the closest to the object; and r3c is the radius of curvature (r11) of the cemented interface of the third lens group.

Condition (5) specifies the ratio of the radii of curvature of the entrance and exit faces of the negative lens element of which the second lens group is made. If the upper limit of this condition is exceeded, it becomes difficult to correct the coma that occur at high magnification.

If the upper limit of condition (6) is exceeded, the radius of curvature of the cemented interface increases, making it difficult to correct lateral chromatic aberration.

EXAMPLE 1

Figure 3:
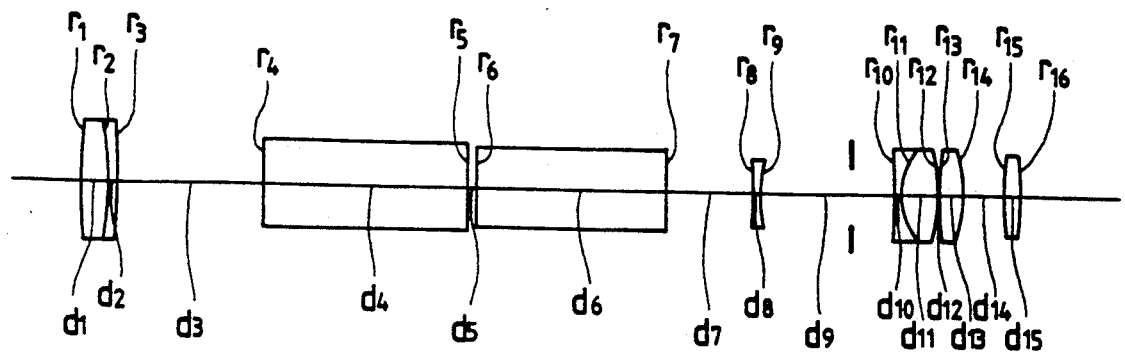
FIG. 3 is a simplified diagrammatic cross section of the same lens system for a moderate magnification.
Figure 5:
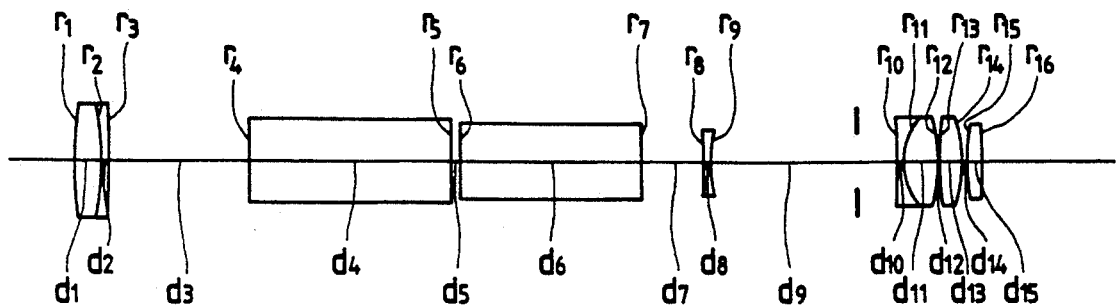
FIG. 5 is a simplified diagrammatic cross section of the same lens system for a high magnification.

FIGS. 1, 3 and 5 are simplified diagrammatic cross sections showing a first example of the zooming optical system of the present invention, with FIG. 1 illustrating low magnification, FIG. 3 illustrating moderate magnification and FIG. 5 illustrating high magnification.

Specific numeric data for the system are given in Table 1. In Example 1, the magnification is altered by changing d7, d9 and d14, and the numerical data for the respective alterations are given in Table 2. The fourth to the seventh surfaces are those of erecting prisms. The system of Example 1 satisfies conditions (1)–(6) as shown in Table 3.

In all of the tables, r is the radius of curvature of an individual lens surface, d is the lens thickness or the air space between lens surfaces, n is the refractive index of a lens, $\nu$ is the Abbe number of a lens, fC is the focal length of the objective optical unit, fe is the focal length of the eyepiece optical unit, and $\omega$ is the half view angle.

Figure 2:
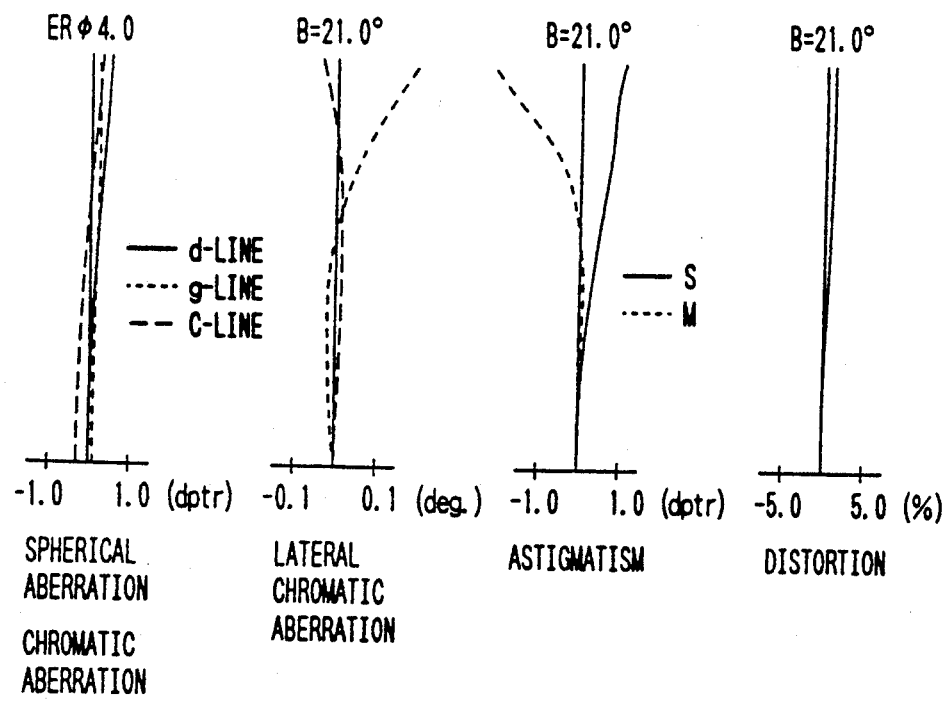
FIG. 2 is a graph plotting the aberration curves obtained for the lens system of FIG. 1 at low magnification.
Figure 4:
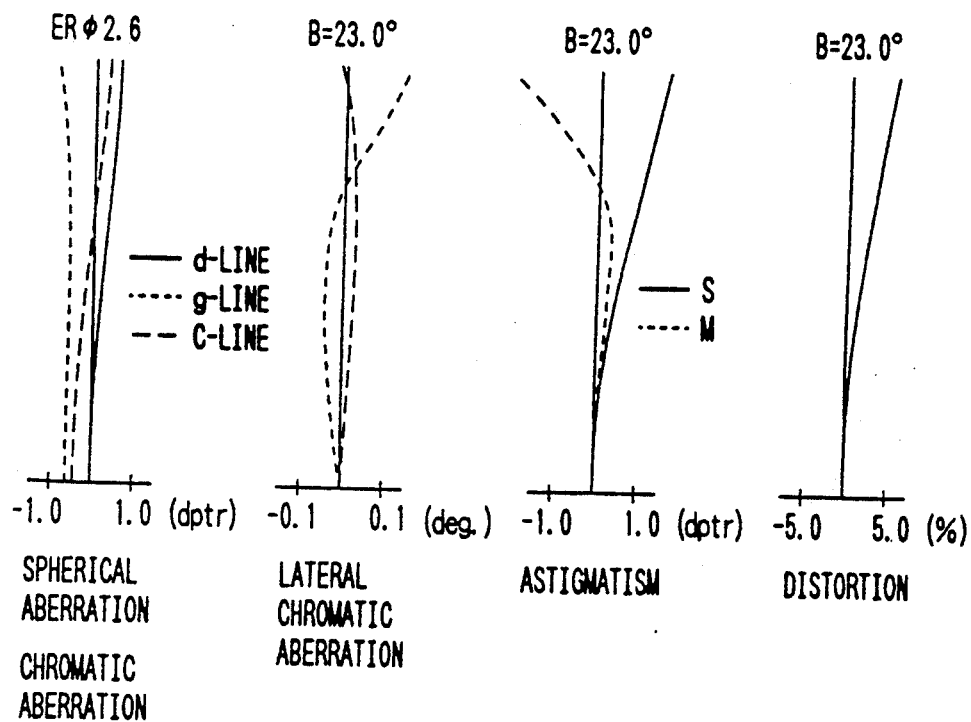
FIG. 4 is a graph plotting the aberration curves obtained for the lens of FIG. 3 at moderate magnification.
Figure 6:
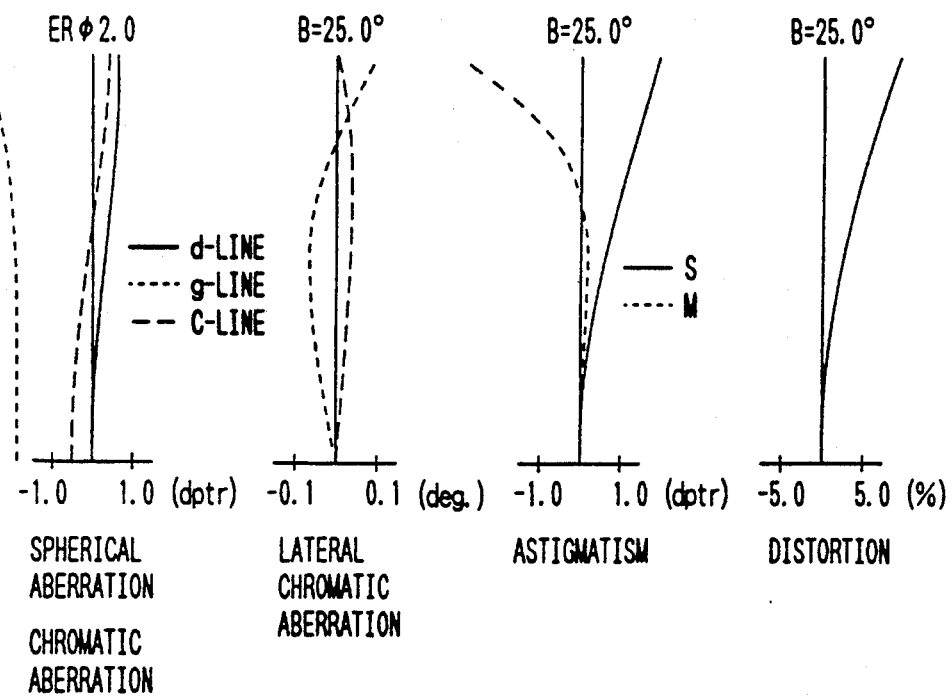
FIG. 6 is a graph plotting the aberration curves obtained for the lens of FIG. 5 at high magnification.

The aberration curves obtained with the lens composition under consideration are plotted in FIG. 2 for low magnification, in FIG. 4 for moderate magnification and in FIG. 6 for high magnification.

TABLE 1

| Surface No. | r | d | n | $\nu$ |
|---|---|---|---|---|
| 1 | 63.811 | 4.79 | 1.51633 | 64.1 |
| 2 | −38.439 | 1.31 | 1.62004 | 36.3 |
| 3 | −117.465 | 23.76 | | |
| 4 | ∞ | 33.26 | 1.56883 | 56.3 |
| 5 | ∞ | 1.58 | | |
| 6 | ∞ | 30.09 | 1.56883 | 56.3 |
| 7 | ∞ | variable | | |
| 8 | −70.480 | 1.31 | 1.51633 | 64.1 |
| 9 | 26.398 | variable | | |
| 10 | −322.719 | 1.31 | 1.80518 | 25.4 |
| 11 | 11.419 | 5.82 | 1.71300 | 53.8 |
| 12 | −23.749 | 0.17 | | |
| 13 | 55.560 | 3.72 | 1.51633 | 64.1 |
| 14 | −21.238 | variable | | |
| 15 | 35.161 | 2.56 | 1.51633 | 64.1 |
| 16 | −54.737 | | | |

TABLE 2

| | Low Magnification | Moderate Magnification | High Magnification |
|---|---|---|---|
| f0 | 100.00 | 133.95 | 158.93 |
| fe | 16.69 | 15.02 | 13.36 |
| $\omega$ | 3.50° | 2.56° | 2.08° |
| d7 | 23.27 | 14.41 | 10.30 |
| d9 | 7.03 | 21.13 | 31.71 |
| d14 | 12.28 | 7.04 | 0.57 |

TABLE 3

| | |
|---|---|
| few/fet | 1.250 |
| fG4/fG3 | 2.241 |
| \|r11/r10\| | 0.035 |
| nav | 1.601 |
| few/fG4 | 0.399 |
| \|r9/r8\| | 0.375 |

EXAMPLE 2

Figure 7:
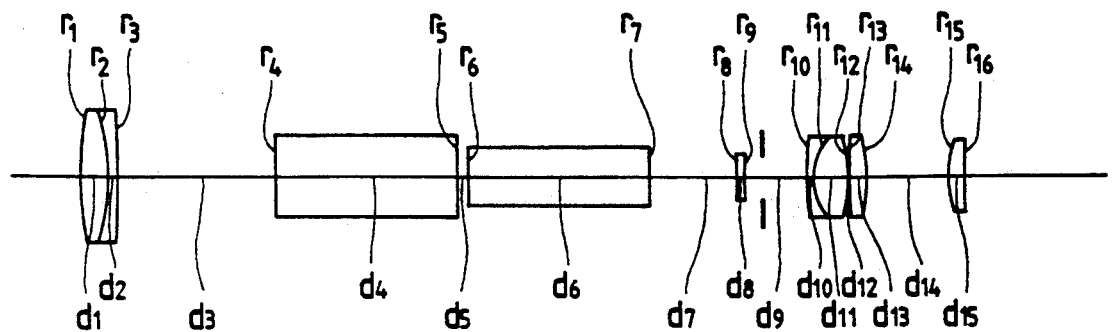
FIG. 7 is a simplified diagrammatic cross section of a lens system for an afocal zooming lens system according to a second embodiment of the present invention, at low magnification.
Figure 9:
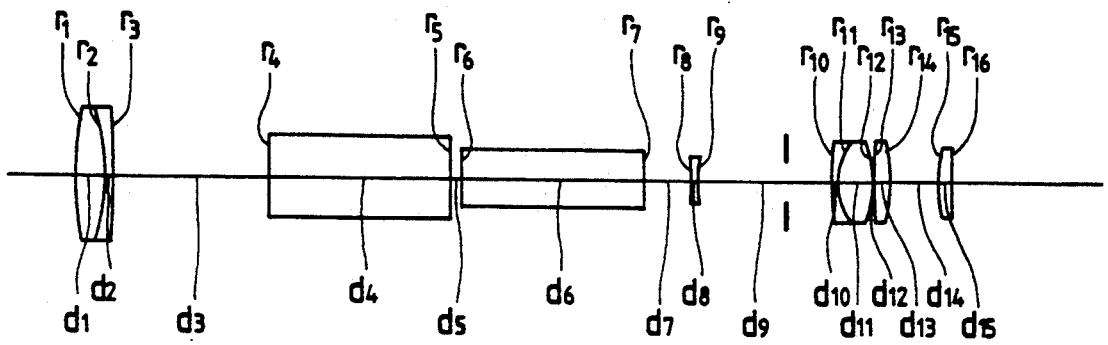
FIG. 9 is a simplified diagrammatic cross section of the same lens system as in FIG. 7 but at moderate magnification.
Figure 11:
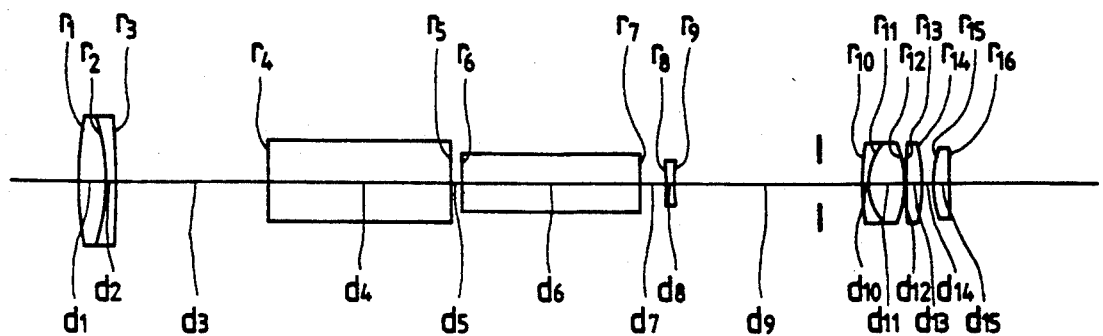
FIG. 11 is a simplified diagrammatic cross section of the same lens system as in FIG. 7 but at high magnification.

FIGS. 7, 9 and 11 are simplified diagrammatic cross sections showing a second example of the zooming optical system of the present invention, with FIG. 7 illustrating low magnification, FIG. 9 illustrating moderate magnification and FIG. 11 illustrating high magnification. Specific numerical data for the system are given in Table 4. In Example 2, the magnification is altered by changing d7, d9 and d14 and the numerical data for the respective alterations are given in Table 5. The system of Example 2 satisfies conditions (1)–(6) as shown in Table 6.

Figure 8:
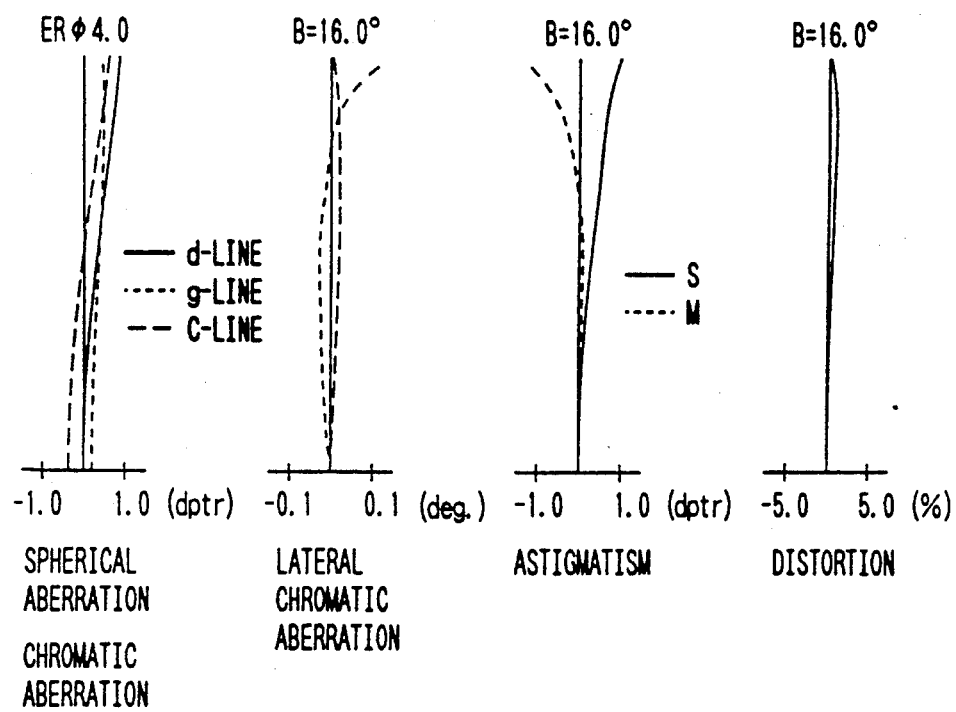
FIG. 8 is a graph plotting the aberration curves obtained for the lens system of FIG. 7 at low magnification.
Figure 10:
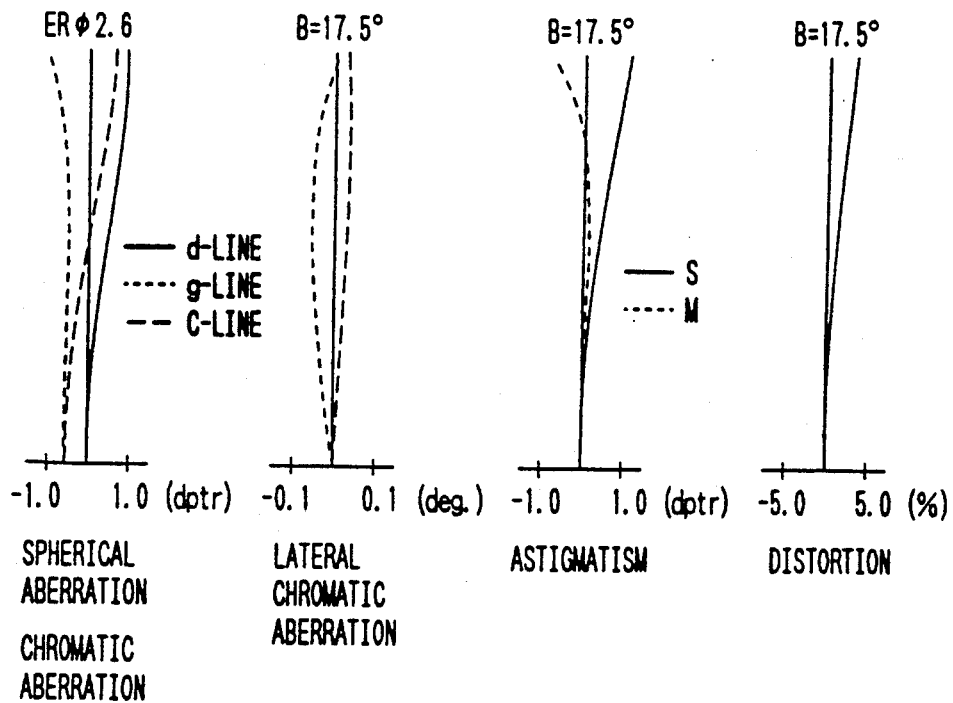
FIG. 10 is a graph plotting the aberration curves obtained for the lens system of FIG. 9 at moderate magnification.
Figure 12:
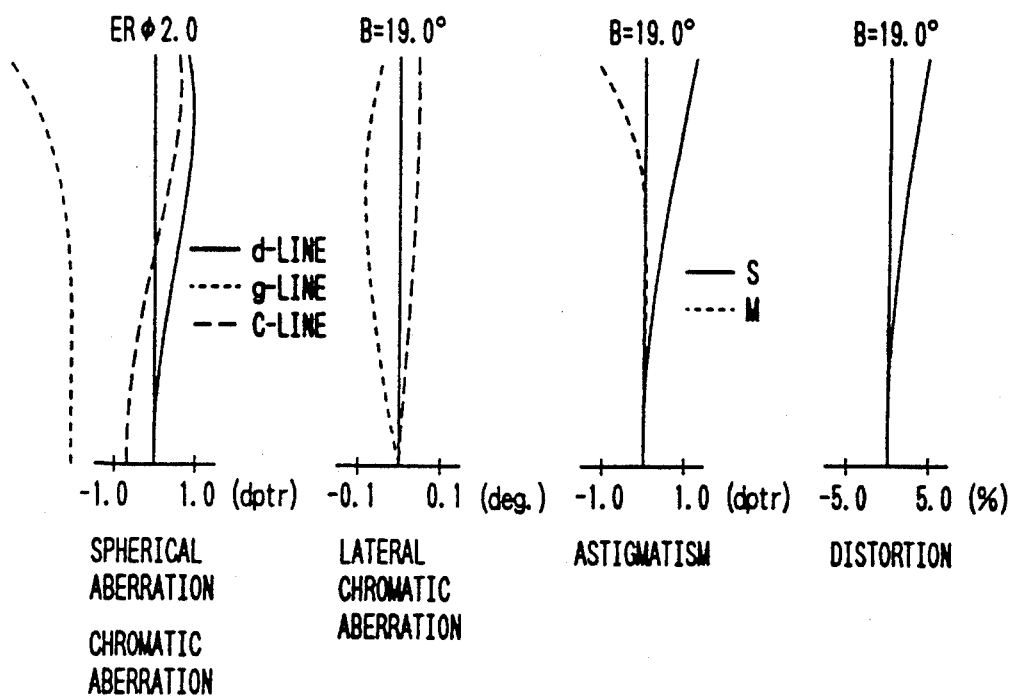
FIG. 12 is ia graph plotting the aberration curves obtained for the lens system of FIG. 11 at high magnification.

The aberration curves obtained with the lens composition under consideration are plotted in FIG. 8 for low magnification, in FIG. 10 for moderate magnification and in FIG. 12 for high magnification.

TABLE 4

| Surface No. | r | d | n | ν |
|---|---|---|---|---|
| 1 | 57.232 | 4.99 | 1.51633 | 64.1 |
| 2 | −36.823 | 1.45 | 1.62004 | 36.3 |
| 3 | −116.590 | 25.89 | | |
| 4 | ∞ | 29.93 | 1.56883 | 56.3 |
| 5 | ∞ | 1.81 | | |
| 6 | ∞ | 29.93 | 1.56883 | 56.3 |
| 7 | ∞ | variable | | |
| 8 | −41.540 | 1.18 | 1.51633 | 64.1 |
| 9 | 26.168 | variable | | |
| 10 | 55.235 | 1.18 | 1.80518 | 25.4 |
| 11 | 10.857 | 5.62 | 1.71300 | 53.8 |
| 12 | −22.194 | 0.36 | | |
| 13 | 145.117 | 2.63 | 1.51633 | 64.1 |
| 14 | −26.719 | variable | | |
| 15 | 19.391 | 2.36 | 1.51633 | 64.1 |
| 16 | 141.943 | | | |

TABLE 5

| | Low Magnification | Moderate Magnification | High Magnification |
|---|---|---|---|
| f0 | 100.00 | 131.84 | 155.83 |
| fe | 16.45 | 14.68 | 13.14 |
| ω | 2.67° | 1.94° | 1.58° |
| d7 | 14.31 | 7.77 | 4.61 |
| d9 | 10.23 | 22.23 | 31.36 |
| d14 | 13.37 | 7.90 | 1.93 |

TABLE 6

| few/fet | 1.252 |
|---|---|
| fG4/fG3 | 2.501 |
| \|r11/r10\| | 0.197 |
| nav | 1.601 |
| few/fG4 | 0.381 |
| \|r9/r8\| | 0.630 |

EXAMPLE 3

Figure 13:
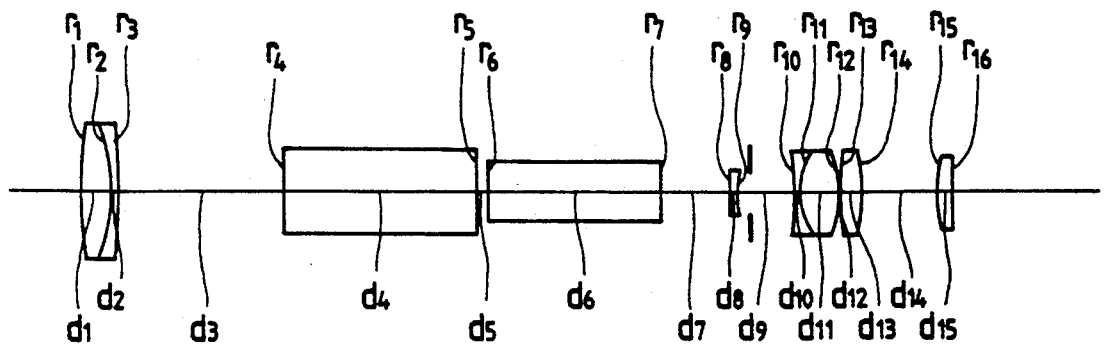
FIG. 13 is a simplified diagrammatic cross section of the lens system in an afocal zooming optical system according to a third embodiment of the present invention, at low magnification.
Figure 15:
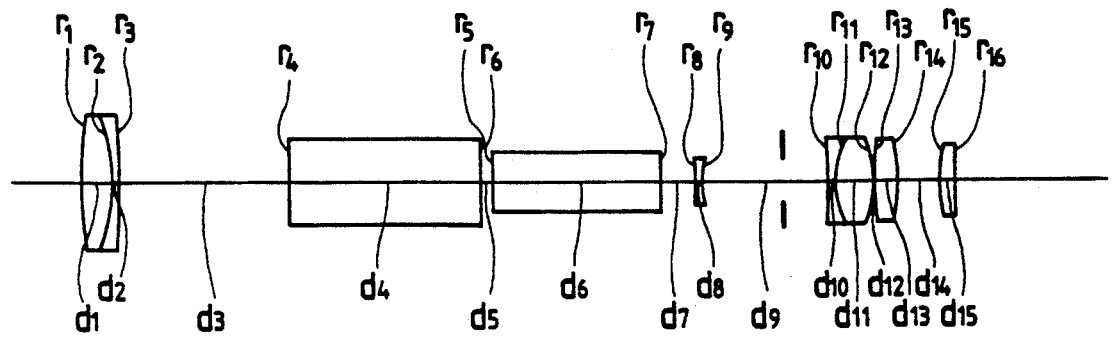
FIG. 15 is a simplified diagrammatic cross section of the same lens system as in FIG. 13 but at moderate magnification.
Figure 17:
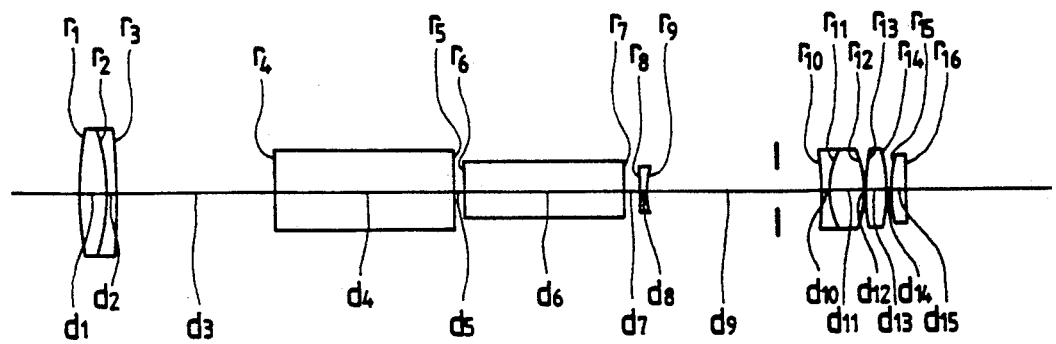
FIG. 17 is a simplified diagrammatic cross section of the same lens system as in FIG. 13 but at high magnification.

FIGS. 13, 15 and 17, are simplified diagrammatic cross sections showing a third example of the zooming optical system of the present invention, with FIG. 13 illustrating low magnification, FIG. 15 illustrating moderate magnification and FIG. 17 illustrating high magnification. Specific numerical data for the system are given in Table 7. In Example 3, the magnification is altered by changing d7, d9 and d14, and the numerical data for the respective alterations are given in Table 8. The system of Example 3 satisfies conditions (1)–(6) as shown in Table 9.

In this example, two of the five lens elements in the eyepiece optical unit, namely, the first lens positioned closest to the object and the fourth lens, are plastic lenses.

Figure 14:
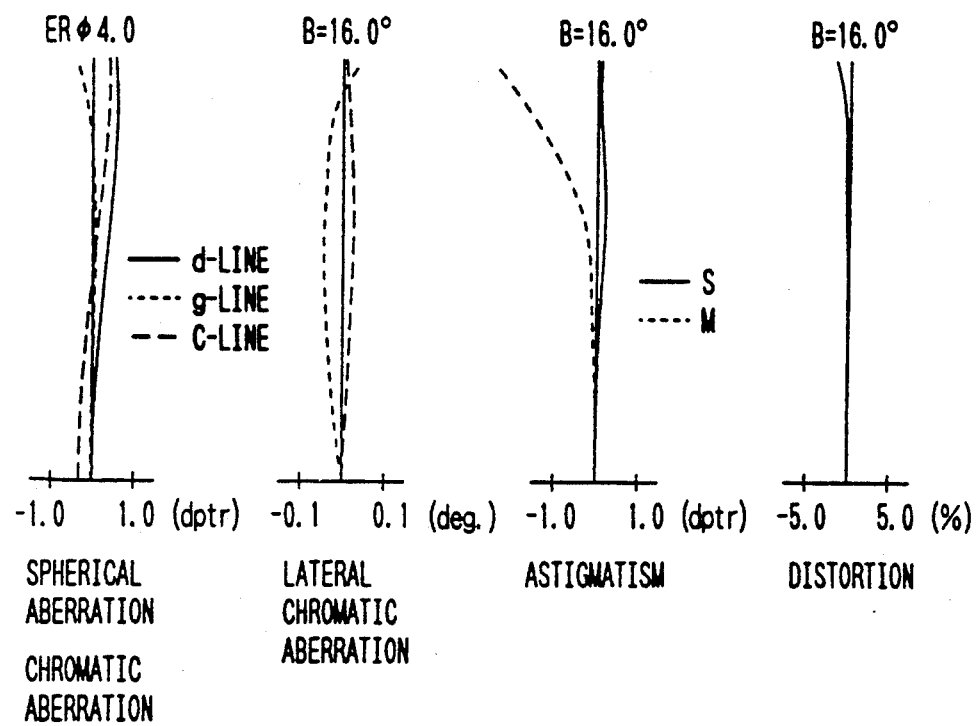
FIG. 14 is a graph plotting the aberration curves obtained for the lens system of FIG. 13 at low magnification.
Figure 16:
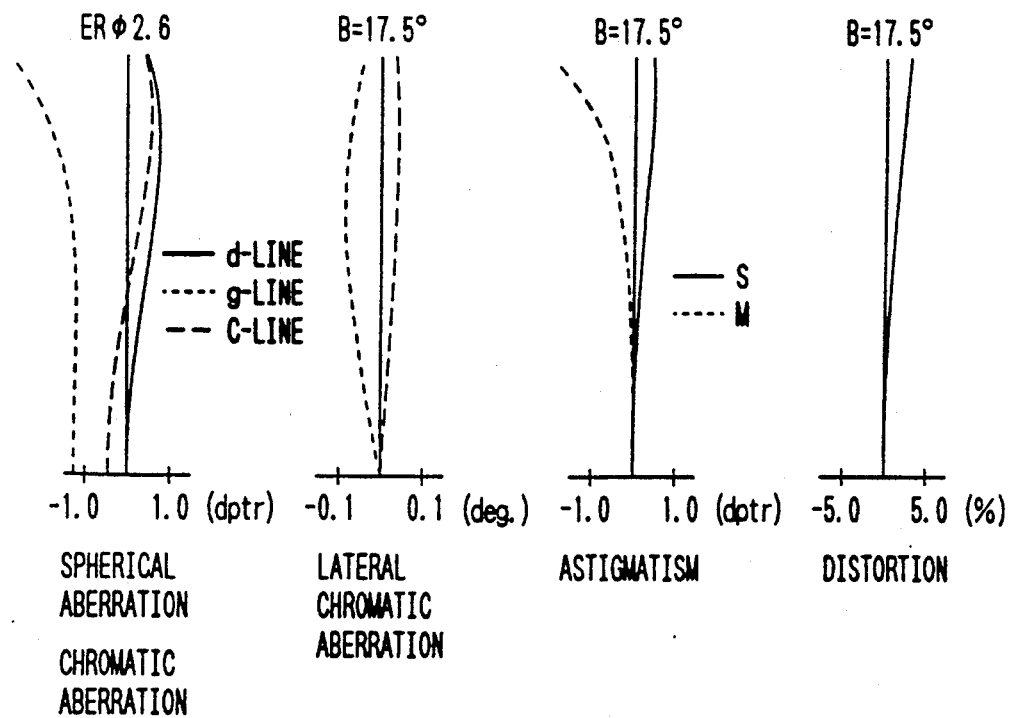
FIG. 16 is a graph plotting the aberration curves obtained for the lens system of FIG. 15 at moderate magnification.
Figure 18:
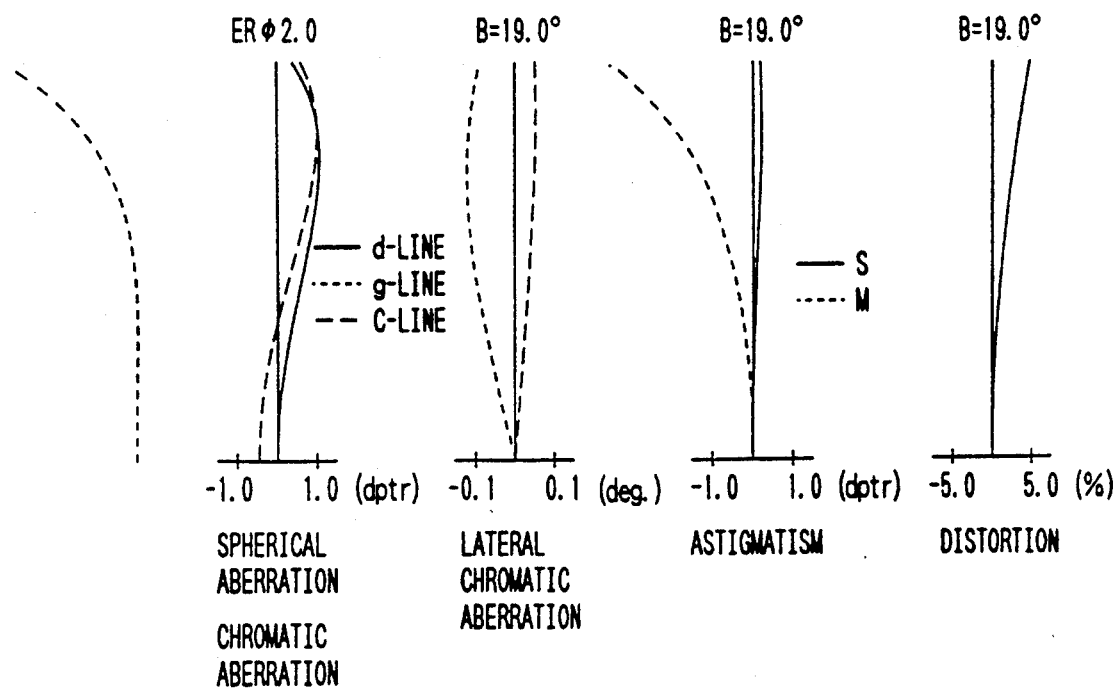
FIG. 18 is a graph plotting the aberration curves obtained for the lens system of FIG. 17 at high magnification.

The aberration curves obtained with the lens composition under consideration are plotted in FIG. 14 for low magnification, in FIG. 16 for moderate magnification and in FIG. 18 for high magnification.

TABLE 7

| Surface No. | r | d | n | ν |
|---|---|---|---|---|
| 1 | 64.573 | 5.24 | 1.51633 | 64.1 |
| 2 | −33.786 | 1.52 | 1.62004 | 36.3 |
| 3 | −95.352 | 28.57 | | |
| 4 | ∞ | 32.38 | 1.56883 | 56.3 |
| 5 | ∞ | 1.91 | | |
| 6 | ∞ | 28.57 | 1.56883 | 56.3 |
| 7 | ∞ | variable | | |
| 8 | −160.979 | 1.24 | 1.492 | 57.4 |
| 9 | 14.802 | variable | | |
| 10 | −63.592 | 1.24 | 1.80518 | 25.4 |
| 11 | 14.263 | 6.57 | 1.71300 | 53.8 |
| 12 | −17.104 | 0.38 | | |
| 13 | 50.744 | 3.52 | 1.492 | 57.4 |
| 14 | −27.452 | variable | | |
| 15 | 24.422 | 2.67 | 1.51633 | 64.1 |
| 16 | 186.044 | | | |

TABLE 8

| | Low Magnification | Moderate Magnification | High Magnification |
|---|---|---|---|
| f0 | 100.00 | 136.95 | 165.13 |
| fe | 16.66 | 15.28 | 13.96 |
| ω | 2.67° | 1.94° | 1.58° |
| d7 | 12.35 | 5.78 | 2.75 |
| d9 | 9.55 | 21.55 | 30.82 |
| d14 | 12.51 | 7.07 | 0.84 |

TABLE 9

| few/fet | 1.194 |
|---|---|
| fG4/fG3 | 2.924 |
| \|r11/r10\| | 0.224 |
| nav | 1.594 |
| few/fG4 | 0.308 |
| \|r9/r8\| | 0.092 |

As described on the foregoing pages, the present invention provides an afocal zooming optical system that is capable of suppressing variations in the apparent field of view during zooming, that is compact, that permits ease in viewing the image, and that is yet effectively corrected for aberrations.

What is claimed is:

1. An afocal zooming optical system comprising, in order from the object side, an objective optical unit comprising a positive first lens component, an erecting prism component and a negative second lens component, and an eyepiece optical unit comprising a three-element positive third lens component and a single-element positive fourth lens component, which system performs zooming by moving said second and third lens components in different directions along the optical axis and satisfies the following conditions:

few/fet ≦ 1.30

1.70 < fG4/fG3 < 4.50 where few is the focal length of the eyepiece optical unit at low magnification, fet is the focal length of the eyepiece optical unit at high magnification, fG3 is the focal length of the third lens component, and fG4 is the focal length of the fourth lens component.

2. An afocal zooming optical system according to claim 1, which further satisfies the following condition:

few/fG4 < 0.55

3. An afocal zooming optical system according to claim 1, which further satisfies the following condition:

$$nav < 1.63$$

where nav is the mean refractive index at the d-line of the lens elements included in said respective lens components.

4. An afocal zooming optical system according to claim 1 wherein said second lens component includes only a single negative lens element and said third lens component includes a positive-to-negative cemented lens and a positive lens element, said optical system further satisfying the following conditions:

$$|r2i/r2o| < 0.85$$

$$|r3c/r3i| < 0.50$$

where r2i is the radius of curvature of the entrance face of the second lens component, r2o is the radius of curvature of the exit face of the second lens component, r3i is the radius of curvature of the face of the third lens component that is the closest to the object, and r3c is the radius of curvature of the cemented interface of the third lens component.

* * * * *